United States Patent
Ellmer

(10) Patent No.: US 11,156,140 B2
(45) Date of Patent: Oct. 26, 2021

(54) ELECTRICALLY HEATABLE CATALYST AND METHOD FOR OPERATING SAME

(71) Applicant: Vitesco Technologies Germany GMBH, Hannover (DE)

(72) Inventor: Dietmar Ellmer, Munich (DE)

(73) Assignee: Vitesco Technologies Germany GmbH, Hannover (DE)

( * ) Notice: Subject to any disclaimer, the term of this patent is extended or adjusted under 35 U.S.C. 154(b) by 0 days.

(21) Appl. No.: 17/111,617

(22) Filed: Dec. 4, 2020

(65) Prior Publication Data

US 2021/0148269 A1     May 20, 2021

Related U.S. Application Data

(63) Continuation of application No. PCT/EP2019/062609, filed on May 16, 2019.

(30) Foreign Application Priority Data

Jun. 4, 2018    (DE) ..................... 10 2018 208 718.0

(51) Int. Cl.
  *F01N 3/00*     (2006.01)
  *F01N 3/20*     (2006.01)

(52) U.S. Cl.
  CPC .................................. *F01N 3/2013* (2013.01)

(58) Field of Classification Search
  CPC .. F01N 3/2013; F01N 2240/16; F01N 13/009; F01N 13/0097

(Continued)

(56) References Cited

U.S. PATENT DOCUMENTS 6,167,696 B1 * 1/2001 Maaseidvaag ........ F01N 13/009
                                                          60/274
6,235,254 B1 * 5/2001 Murphy ................ F01N 13/009
                                                          423/212

(Continued)

FOREIGN PATENT DOCUMENTS

DE          2333092 A1 * 1/1975 ........... F01N 3/2013
DE          4035971 A1    5/1992
DE     102017113712 A1 * 12/2018 ........... F01N 13/009

OTHER PUBLICATIONS

International Search Report and Written Opinion dated Jun. 24, 2019 from corresponding International Patent Application No. PCT/EP2019/062609.

(Continued)

*Primary Examiner* — Jason D Shanske

(57) ABSTRACT

An electrically heatable catalytic converter for the catalytic treatment of an exhaust gas in an exhaust-gas tract of an internal combustion engine is disclosed. The catalytic converter includes a first catalysis region for the catalytic treatment of the exhaust gas, and a second catalysis region is separate from the first catalysis region. The second catalysis region for the catalytic treatment of the exhaust gas is arranged downstream of the first catalysis region with a predetermined spacing to the first catalysis region. The catalytic converter includes an electric heating device through which the exhaust gas can flow. The electric heating device is arranged downstream of the first catalysis region and upstream of the second catalysis region and is designed to at least partially heat the first catalysis region and the second catalysis region.

3 Claims, 8 Drawing Sheets

(58) Field of Classification Search
USPC .......................................................... 60/274
See application file for complete search history.

(56) References Cited

U.S. PATENT DOCUMENTS

| | | | | |
|---|---|---|---|---|
| 6,325,054 B1* | 12/2001 | Wenger | ................ | F01N 3/2006 |
| | | | | 123/559.2 |
| 7,829,048 B1 | 11/2010 | Gonze et al. | | |
| 8,776,495 B2* | 7/2014 | Gonze | .................... | F01N 13/02 |
| | | | | 60/284 |
| 2001/0010804 A1* | 8/2001 | Majima | .................... | F01N 3/28 |
| | | | | 422/180 |
| 2008/0173007 A1* | 7/2008 | Imes | ....................... | F01N 3/023 |
| | | | | 60/274 |
| 2008/0282686 A1* | 11/2008 | Gonze | ....................... | F01N 9/00 |
| | | | | 60/300 |
| 2010/0313547 A1 | 12/2010 | Gonze et al. | | |
| 2011/0030344 A1* | 2/2011 | Gonze | ................ | B60W 10/06 |
| | | | | 60/274 |
| 2012/0060471 A1 | 3/2012 | Gonze et al. | | |
| 2013/0152553 A1 | 6/2013 | Gonze et al. | | |
| 2018/0334939 A1* | 11/2018 | Mital | .................... | F01N 3/2066 |

OTHER PUBLICATIONS

German Office Action dated Apr. 11, 2019 for corresponding German Patent Application No. 10 2018 208 718.0.

\* cited by examiner

ELECTRICALLY HEATABLE CATALYST AND METHOD FOR OPERATING SAME

CROSS-REFERENCE TO RELATED APPLICATIONS

This application claims the benefit of International Application PCT/EP2019/062609, filed May 16, 2019, which claims priority to German Application DE 10 2018 208 718.0, filed Jun. 4, 2018. The disclosures of the above applications are incorporated herein by reference.

TECHNICAL FIELD

The disclosure relates to an electrically heatable catalytic converter, and to a method for operating a catalytic converter of said type.

BACKGROUND

Catalytic converters are provided in particular in vehicles with an internal combustion engine for the purposes of performing exhaust-gas aftertreatment in an exhaust-gas tract of the internal combustion engine in order to thus reduce pollutant emissions in an exhaust gas of the internal combustion engine. Here, a catalytic treatment or chemical conversion of combustion pollutants is performed in the catalytic converter by oxidation or reduction of the respective pollutant. For this purpose, the catalytic converter generally has a catalysis region in which the chemical conversion—catalysis—takes place.

The required operating temperature normally lies in a fuel-dependent and coating-dependent range starting at a minimum of approximately 250° C., because the catalysis that is performed in the catalysis region requires a certain minimum temperature, also referred to as light-off temperature, for effective exhaust-gas aftertreatment.

In order to comply with ever more stringent emissions legislation, it is necessary to bring the catalytic converter to the desired operating temperature quickly. For this purpose, on the one hand, combustion measures may be implemented, that is to say measures may be implemented with which the internal combustion engine is operated such that the waste heat of the internal combustion engine can be used to heat the catalytic converter. However, this leads to higher fuel consumption.

On the other hand, it is also possible to use an electrically heatable catalytic converter. Such catalytic converters have a dedicated electric heating device, which is electrically operated and brings the catalytic converter to the desired operating temperature. An advantage of an electrically heatable catalytic converter is that the catalytic converter may be brought to operating temperature in a so-called catalytic converter cold phase even without operation of the internal combustion engine. This saves fuel. A disadvantage of such catalytic converters is however that, because the internal combustion engine is not in operation, the heat generated locally at the heating device is only insufficiently transported into the catalytic converter and a pronounced temperature gradient rises across the catalytic converter, in particular across the heating device. This can lead to overheating and even destruction of the heating device and/or of the catalytic converter.

SUMMARY

The disclosure provides an electrically heatable catalytic converter which may be efficiently operated and which has a less pronounced temperature gradient during the heating of the catalytic converter. Additionally, the disclosure provides a method for operating a catalytic converter of said type.

According to a first aspect of the disclosure, an electrically heatable catalytic converter for the catalytic treatment of an exhaust gas in an exhaust-gas tract of an internal combustion engine is provided. The catalytic converter includes a first catalysis region for the catalytic treatment of the exhaust gas and a second catalysis region. The second catalysis region is separate from the first catalysis region. The second catalysis region is for the catalytic treatment of the exhaust gas. Additionally, the second catalysis region is arranged downstream, that is to say downstream in a flow direction of the exhaust gas, of the first catalysis region with a predetermined spacing to the first catalysis region. The first and the second catalysis regions are normally formed as honeycomb bodies which are composed of a ceramic or of metal coated with a so-called washcoat and on which the catalytic treatment or conversion of the exhaust gas takes place.

The catalytic converter furthermore includes an electric heating device through which the exhaust gas can flow. The electric heating device is arranged downstream of the first catalysis region and upstream of the second catalysis region. The electric heating device is designed to at least partially heat the first catalysis region and the second catalysis region. The electric heating device is thus arranged, in an exhaust-gas flow direction, downstream of the first catalysis region and upstream of the second catalysis region, or in other words between the first and the second catalysis region. By virtue of the fact that the electric heating device is situated between the first and the second catalysis region, the heat energy of the heating device may be transferred uniformly to the first and second catalysis regions, whereby a temperature gradient across the catalytic converter can be reduced.

Implementations of the disclosure may include one or more of the following optional features. In some implementations, a gas volume which is situated in the catalytic converter and which is heated by the heating device is moved, by a suitable method that will be described further below, both into the second catalysis region and into the first catalysis region. By the movement of the heated gas volume both into the first and into the second catalysis region, convective heat transport between the heating device and the first and second catalysis regions is generated, which can further reduce the temperature gradient. Furthermore, with the same heat input, the catalytically active volume, that is to say that proportion of the first and second catalysis regions which has attained the operating temperature, can be increased.

The catalytic converter makes it possible, even in a catalytic converter cold phase in which the internal combustion engine is not in operation, for the catalytic converter to be heated to the desired operating temperature quickly, and at the same time for temperature peaks in the catalytic converter to be minimized.

In some implementations, the first catalysis region and the second catalysis region have an equal length in a flow direction of the exhaust gas. In other words, the heating device is arranged symmetrically in the longitudinal extent direction of the catalytic converter, which is parallel to the exhaust-gas flow direction. In this way, the first catalysis region and the second catalysis region can be heated to operating temperature approximately uniformly, such that the temperature gradient across the catalytic converter can be further reduced.

In some examples, the first catalysis region and the second catalysis region are in contact with the electric heating device, where the contact does not impair the function of the heating device. In this way, the heat energy introduced by the heating device is also introduced directly into the first and second catalysis regions by the heat conduction between the heating device and the first and second catalysis regions.

In some implementations, the electric heating device is an electrically heatable heating disk. By virtue of the heating device being in the form of a heating disk, the heat energy may be transferred to approximately the entire end face of the first and second catalysis regions, such that the first and second catalysis regions can be heated quickly and efficiently.

Another aspect of the disclosure provides a method for heating an electrically heatable catalytic converter according to the first aspect. The method includes steps for heating the catalytic converter in a catalytic converter cold phase, that is to say in a phase in which a desired operating temperature of the catalytic converter, for example the light-off temperature of the catalytic converter, has not yet been attained and the internal combustion engine has not yet been started. Here, the catalytic converter is arranged in the exhaust-gas tract of the internal combustion engine. The method includes, in a first step (step a)), activating the electric heating device such that the heating device heats a first gas volume, surrounding the heating device, of the exhaust-gas tract to a predetermined temperature. The predetermined temperature may be derived from the temperature of the heating device or determined by a model. The method includes, in a second step (step b)), moving the heated first gas volume to the first catalysis region in order to heat the first catalysis region, where, as a result of the movement of the first gas volume to the first catalysis region, a second gas volume, which follows the first gas volume, of the exhaust-gas tract moves to the heating device. The following movement of the second gas volume occurs automatically, because the second gas volume is, for example, that gas volume in the catalytic converter which is situated upstream or downstream of the first gas volume in the flow direction. The method includes, in a third step (step c)), activating the electric heating device such that the heating device heats the second gas volume, surrounding the heating device, to a predetermined temperature. The method finally includes, in a fourth step (step d)), moving the heated second gas volume to the second catalysis region in order to heat the second catalysis region.

The first or second gas volume may be an air volume that is situated in the exhaust-gas tract. Through the heating of the first and second gas volumes and the subsequent movement of the first and second gas volumes into the first and second catalysis regions, the first and second catalysis regions can be alternately heated. In this way, with the same heat input into the heating device, the catalytically active volume, that is to say that proportion of the first and second catalysis regions which has attained the operating temperature, can be increased. In this way, a method is provided with which it is possible not only for a catalytic converter to be heated quickly and with a shallow temperature gradient but also for as large as possible a volume of the catalytic converter to be brought to operating temperature within a predetermined time.

In some implementations, steps a) to d) are performed repeatedly until the catalytic converter has attained the desired operating temperature. Here, the operating temperature may be derived either from the temperature of the heating device itself or on the basis of a model which takes into consideration the heat energy introduced into the heating device, the heat transport from the heating device to the first and the second gas volume, and the heat transport from the first and second gas volumes to the first and second catalysis regions.

In some examples, the internal combustion engine is coupled in terms of drive to an electric machine, and the electric machine is activated such that the electric machine rotates alternately in a first direction of rotation, in order to move the first gas volume to the first catalysis region, and in a second direction of rotation, which is opposite to the first direction of rotation, in order to move the second gas volume into the second catalysis region.

In other words, the movement of the first and second gas volumes into the first and second catalysis regions can be performed by a reversal of a direction of rotation of the electric machine which electrically cranks the internal combustion engine. This is possible because the electric machine is connected in terms of drive for example to the crankshaft of the internal combustion engine, such that a reversal of a direction of rotation of the electric machine also leads to a reversal of a direction of rotation of the crankshaft. In this way, the crankshaft rotates for example in a first direction, in which, with suitable positioning of the throttle flap, fresh air can be forced from the intake tract of the internal combustion engine into the exhaust-gas tract of the internal combustion engine, whereby a gas volume of fresh air can be moved from the heating device into the second catalysis region. Upon the reversal of the direction of rotation of the electric machine and of the crankshaft, the crankshaft rotates in a second direction which is opposite to the first direction, whereby a valve position of the inlet and outlet valves is reversed, and the exhaust-gas tract of the internal combustion engine becomes the intake tract of the internal combustion engine. In this way, the internal combustion engine can draw air in from the exhaust-gas tract, whereby it is made possible to draw or move a gas volume from the heating device into the first catalysis region.

In some implementations, the internal combustion engine may also have a fully variable valve drive in which a position of the inlet and outlet valves is independent of a direction of rotation of the crankshaft. In this way, with corresponding positioning of the inlet and outlet valves, a gas volume can be moved from the heating device into the first catalysis region or the second catalysis region even without a reversal of the direction of rotation of the electric machine.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
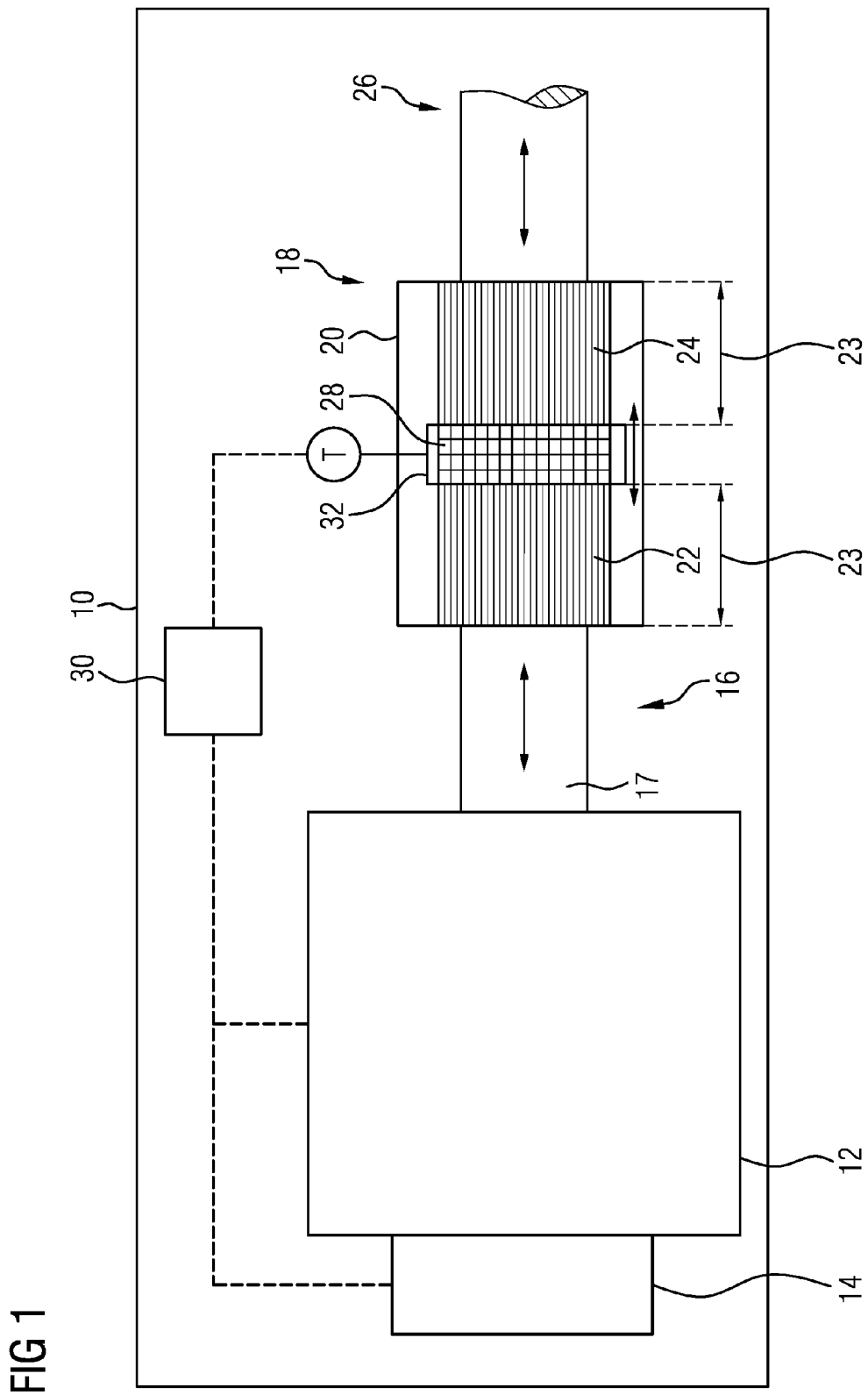
FIG. 1 is a schematic illustration of a vehicle which has an internal combustion engine and an exemplary catalytic converter in an exhaust-gas tract of the internal combustion engine.

Reference is made firstly to FIG. 1, which is a schematic illustration of a vehicle 10 which exhibits an internal combustion engine 12, an electric machine 14 which is connected in terms of drive to the internal combustion engine for example via a crankshaft, and an exhaust-gas tract 16 of the internal combustion engine 12.

An electrically heatable catalytic converter 18 is arranged in the exhaust-gas tract 16. The electrically heatable catalytic converter includes a casing tube 20 in which there are situated a first catalysis region 22 and a second catalysis region 24 which is spaced apart from the first catalysis region with a predetermined spacing. The first catalysis region 22 and the second catalysis region 24 are in this case arranged in series in a flow direction of an exhaust gas 17 of the exhaust-gas tract 16. That is to say, the second catalysis region 24 is arranged downstream of the first catalysis region 22, or after the first catalysis region 22 in a flow direction of the exhaust gas 17.

Both the first catalysis region 22 and the second catalysis region 24 serve for catalytically treating or oxidizing or reducing the exhaust gas 17 of the internal combustion engine 12 that is present in the exhaust-gas tract 16, in order that the exhaust gas 17 can be discharged, substantially free from pollutants, into the surroundings 26. The first and second catalysis regions 22, 24 can therefore also be referred to as active catalysis regions.

So that the catalytic treatment of the exhaust gas 17 in the first catalysis region 22 and the second catalysis region 24 can take place, it is necessary for the first and second catalysis regions 22, 24 to each be at or above a certain operating temperature, which is also known as light-off temperature. To attain this operating temperature, the catalytic converter 18 has an electric heating device 28 which can actively heat the first and second catalysis regions 22, 24.

As can be seen in FIG. 1, the heating device 28 is arranged downstream of the first catalysis region 22 and upstream of the second catalysis region 24, that is to say between the first and second catalysis regions 22, 24. Here, the heating device 28 is designed such that the exhaust gas 17 can flow through the heating device 28 such that the exhaust gas 17 flows firstly through the first catalysis region 22, then through the heating device 28 and then through the second catalysis region 24.

If energy is applied to the heating device 28, the heating device 28 warms up and transfers its heat energy to the first and second catalysis regions 22, 24. The first catalysis region 22 and the second catalysis region 24 have an equal length 23 in an exhaust-gas flow direction. In other words, the heating device 28 is arranged symmetrically between the first and the second catalysis region 22, 24 in the longitudinal extent direction of the catalytic converter 18, that is to say in the exhaust-gas flow direction. Due to the symmetrical arrangement, the heat may be transferred uniformly to the first and second catalysis regions 22, 24. As can also be seen in FIG. 1, the heating device 28 is furthermore in contact with the first and second catalysis regions 22, 24. In this way, the heating device 28 may transfer the heat energy by heat conduction to the end sides of the first and second catalysis regions 22, 24.

The heating device 28 may be in the form of a heating disk. The heating disk may approximately completely fill the interior space of the casing tube 20, such that, when the heating disk is warmed, a large amount of heat energy is available for warming the first and second catalysis regions 22, 24.

The vehicle 10 may also include a control device 30 which is connected in terms of control to the heating disk 28, to the internal combustion engine 12 and to the electric machine 14, as indicated by the dashed lines. Here, the control device 30 can, for example, read out a temperature of the heating device 28 and change an operating mode of the electric machine 14 or of the internal combustion engine 12 in a manner dependent on the measured temperature.

If the catalytic converter 18 is now to be heated starting from a catalytic converter cold phase in which the first and second catalysis regions 22, 24 have not yet attained the desired operating temperature and at the same time the internal combustion engine 12 is at a standstill or is not in operation, energy is applied to the heating device 28. This results in local warming of the heating device 28, such that the heat energy is transferred for example by heat conduction to the first and second catalysis regions 22, 24.

Due to the fact that the internal combustion engine 12 is however not rotating or is at a standstill, when the heating device 28 is warmed, the heat that is locally released at the heating device 28 will not be transported entirely into the first and second catalytic converter regions 22, 24. This can lead to a pronounced temperature gradient across the catalytic converter 18, that is to say in the flow direction of the exhaust gas 17 or in the longitudinal extent direction of the catalytic converter. This pronounced temperature gradient can lead to overheating and ultimately to destruction of the heating device 28. Furthermore, only that end region of the first and second catalytic converter regions 22, 24 which faces toward the heating device 28 is heated.

In order to now heat the catalytic converter 18 more quickly, more efficiently and with a less pronounced temperature gradient, the control device 30 can control operation of the electric machine 14 such that a gas volume 32 that is situated in the region of the heating device 28 is moved downstream and upstream (indicated by the double arrow).

As a result of the movement of the gas volume 32 downstream and upstream of the heating device 28, the gas volume heated by the heating device 28 can be moved into the first and second catalysis regions 22, 24 and thus heat the first and second catalysis regions 22, 24 more efficiently, and with a lower temperature gradient, by convective heat transfer.

Here, the movement of the gas volume 32 downstream of the heating device 28, that is to say to the second catalysis region 24, takes place for example by virtue of the control device 30 controlling the electric machine 14 such that the latter rotates clockwise. As a result, the crankshaft of the internal combustion engine 12 likewise rotates clockwise. If a throttle flap is open, air can now be drawn in from the intake tract of the internal combustion engine 12 and forced into the exhaust-gas tract of the internal combustion engine 12. The fresh air present in the catalytic converter 18 can subsequently be heated by the heating device 28 such that the gas or fresh air volume 32 heated by the heating device 28 can be forced into the second catalysis region 24 by continued rotation of the internal combustion engine 12. There, the heated gas volume 32 can heat the second catalysis region 24.

The movement of the gas volume 32 upstream of the heating device 28, that is to say to the first catalysis region 22, takes place analogously. For example, the control device 30 controls the electric machine 14 such that the latter rotates counterclockwise. This reversal of the direction of rotation of the electric machine 14 results in the reversal of the direction of rotation of the crankshaft of the internal combustion engine 12, such that the valve position of the inlet and outlet valves is likewise reversed. As a result, the exhaust-gas tract of the internal combustion engine 12 becomes the intake tract of the internal combustion engine 12. The internal combustion engine 12 can therefore draw in the gas present in the catalytic converter 18 and move the gas volume 32, for example, to the first catalysis region 22. There, the heated gas volume 32 can heat the first catalysis region 22.

Here, it is not of importance whether the electric machine 14 firstly rotates clockwise or counterclockwise. The mere fact that the reversal of the direction of rotation of the electric machine 14 leads to a reversal of the direction of rotation of the crankshaft and thus to a reversal of the flow direction in the exhaust-gas tract is sufficient to move the gas volume 32 downstream or upstream.

Figure 2:
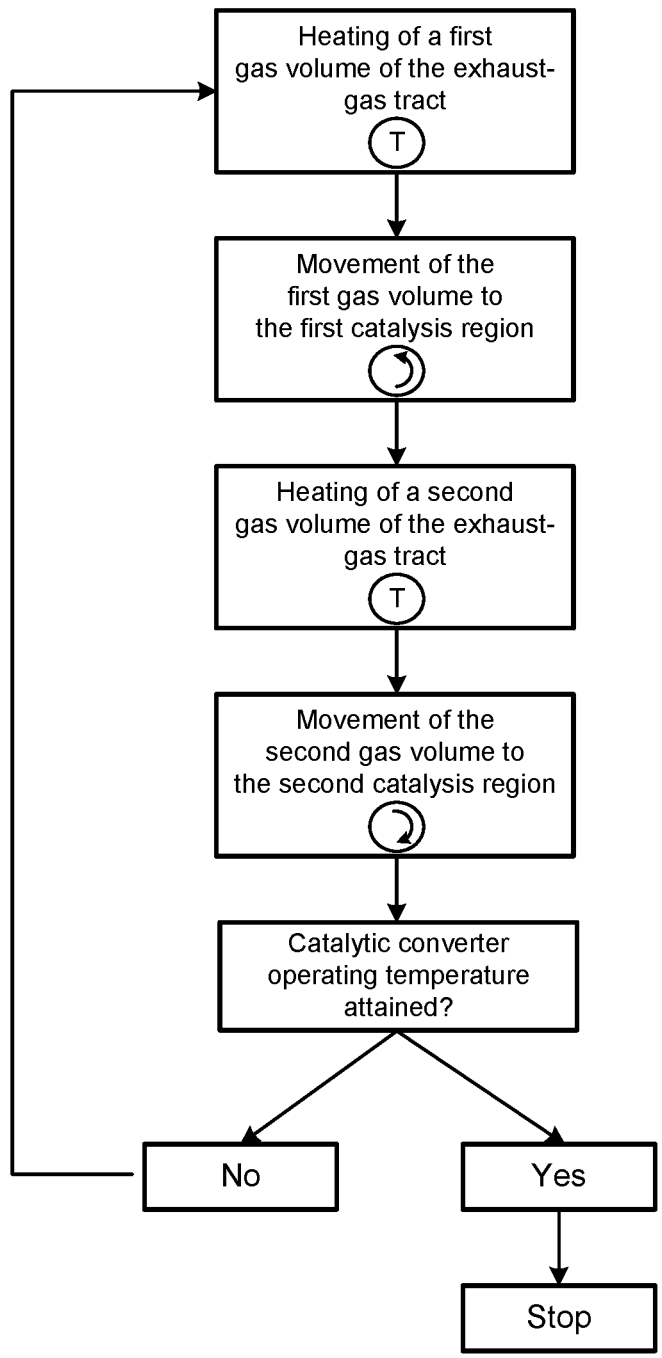
FIG. 2 is a schematic illustration of steps of a method for heating an exemplary catalytic converter in a catalytic converter cold phase.

A method for heating the catalytic converter 18 will now be discussed in greater detail below on the basis of FIGS. 2 to 8. The individual steps of the method are shown in FIGS. 3 to 8. The flow diagram is schematically illustrated in FIG. 2.

Figure 3:
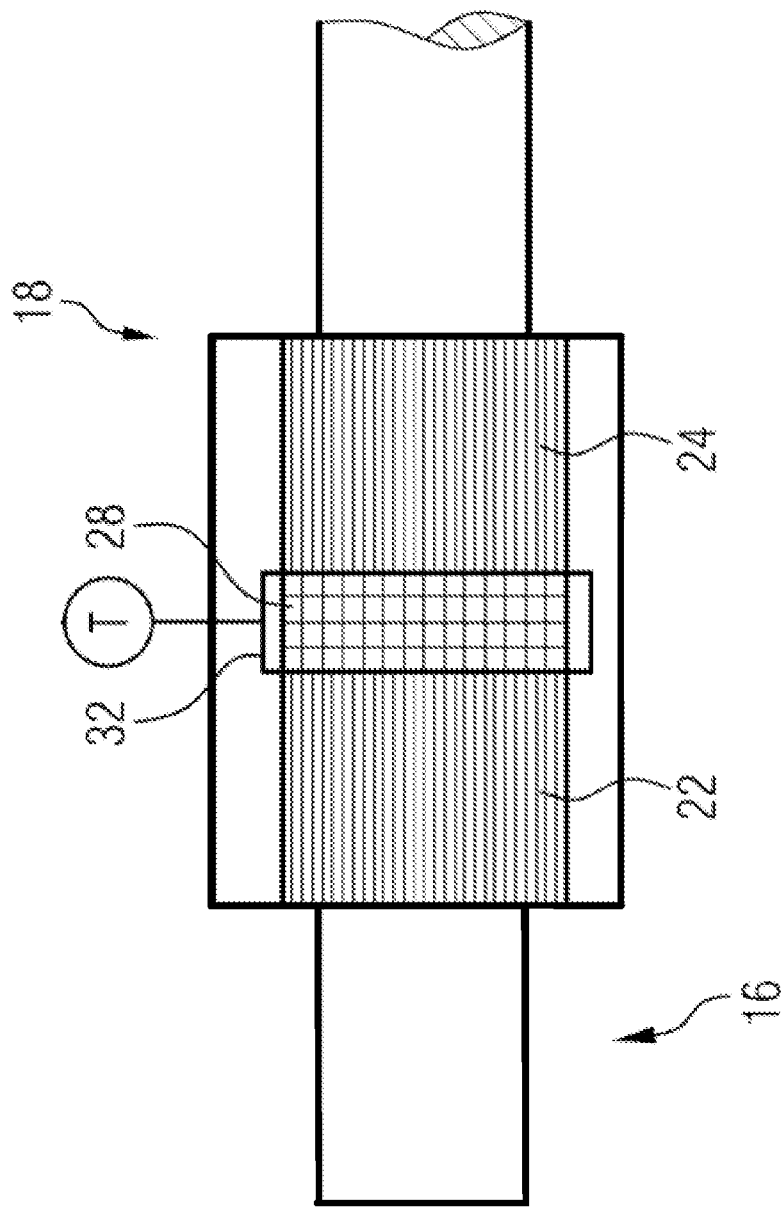
FIGS. 3-8 show a detail view of the exemplary catalytic converter for a more detailed explanation of the method.
Figure 4:
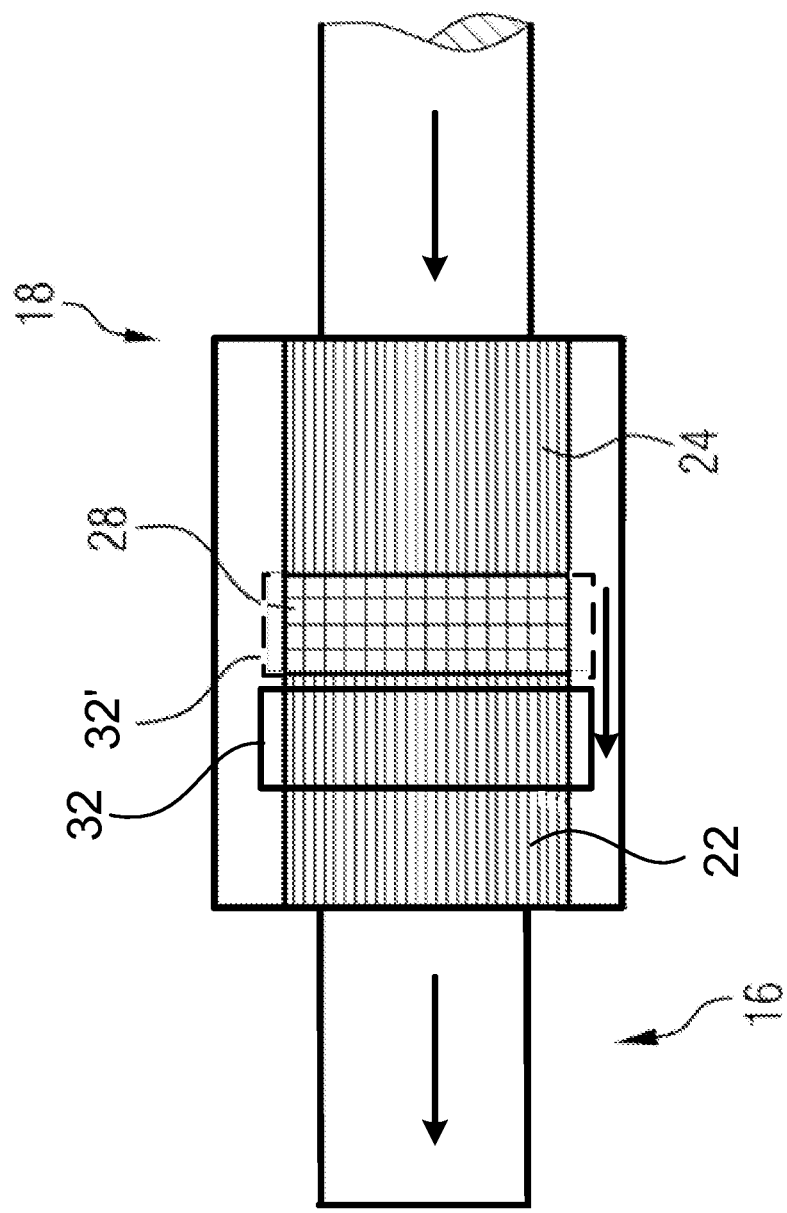

As already mentioned, a first gas volume 32 of the exhaust-gas tract 16 is firstly heated to a predetermined temperature T by the heating device 28 (FIG. 3). This gas volume 32 may be the gas present in the exhaust-gas tract 16 or catalytic converter 18. Here, the predetermined temperature T may be in the range of the desired operating temperature of the catalytic converter 18. The control device 30 ascertains the predetermined temperature T of the first gas volume 32, for example based on the temperature of the heating device 28.

When the control device 30 has ascertained that the temperature of the first gas volume 32 has attained the predetermined temperature T, the control device 30 controls the electric machine 14 in such a way (FIG. 4) that the electric machine 14 rotates in a first direction of rotation (for example counterclockwise). The rotation of the electric machine 14 in the first direction of rotation gives rise to a suction action in the exhaust-gas tract 16, such that the heated first gas volume (indicated by the dashed box 32') is moved from the heating device 28 to the first catalysis region 22. The heated first gas volume 32 can now heat the first catalysis region 22.

Figure 5:
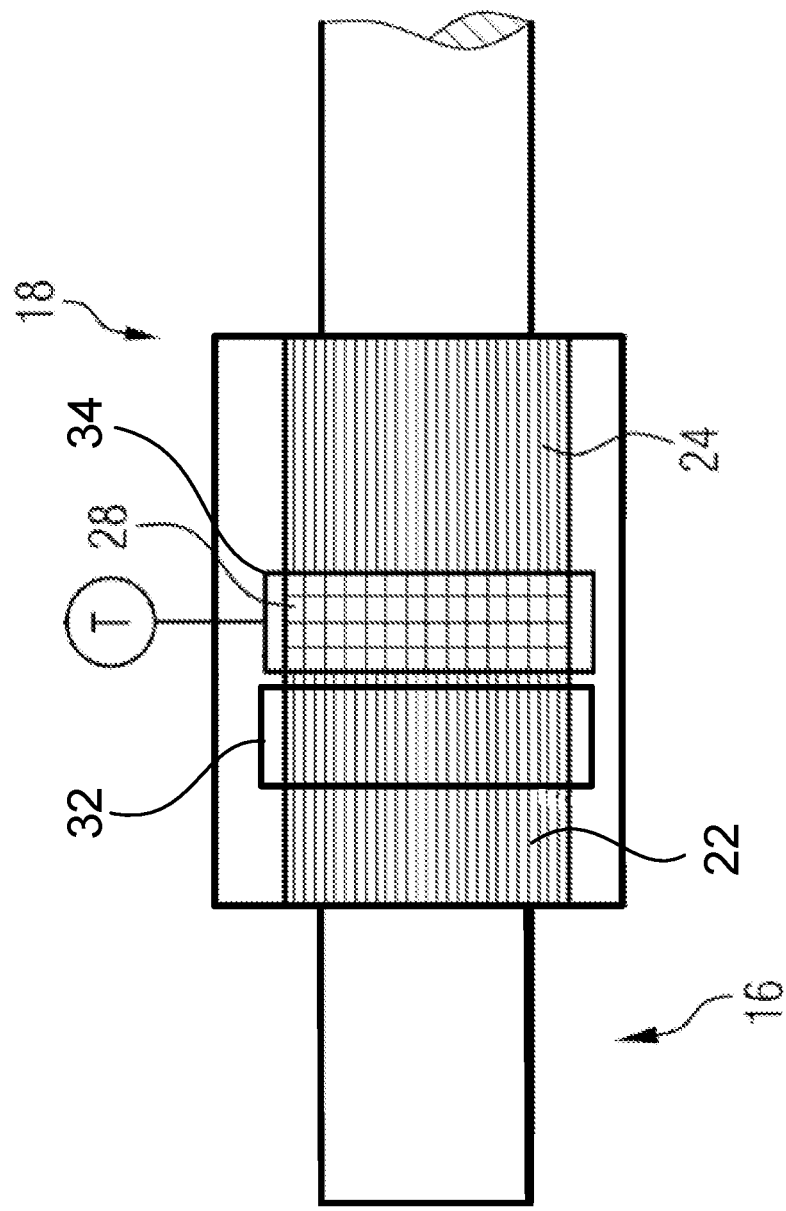
Figure 6:
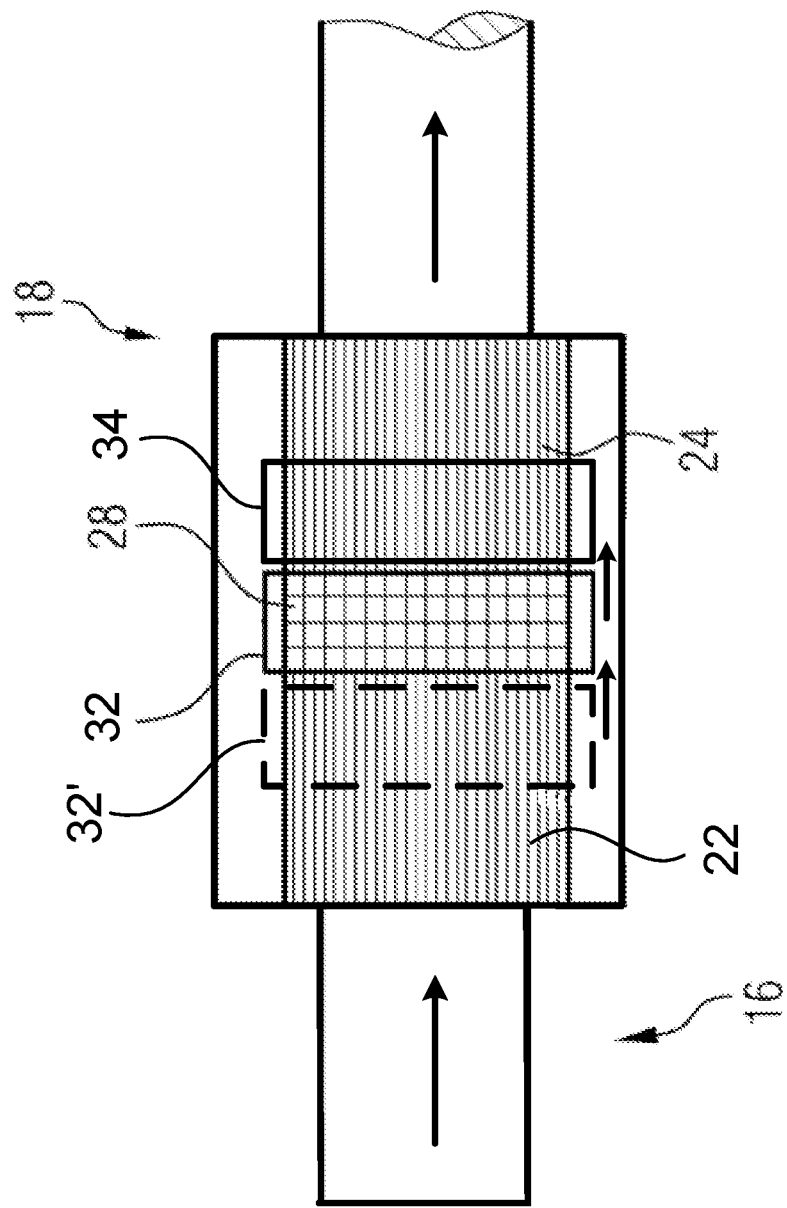

As a result of the movement of the first gas volume 32 to the first catalysis region 22, the heating device 28 is now surrounded by a second gas volume 34 that follows the first gas volume 32 (FIG. 5). The control device 30 controls the heating device 28 in turn such that the second gas volume 34 heats up to a predetermined temperature T, which may be the same predetermined temperature as in the case of the first gas volume 32.

When the control device 30 has ascertained that the temperature of the second gas volume 34 has attained the predetermined temperature T, the control device 30 now controls the electric machine 14 in such a way (FIG. 6) that the electric machine 14 rotates in a second direction of rotation which is opposite to the first direction of rotation (for example clockwise). The rotation of the electric machine 14 in the second direction of rotation gives rise to a thrust action in the exhaust-gas tract 16, such that the heated second gas volume 34 is moved from the heating device 28 to the second catalysis region 24. The heated second gas volume 34 can now heat the second catalysis region 24.

However, during the movement of the second gas volume 34 to the second catalysis region 24, the first gas volume (indicated by the dashed box 32') situated in the first catalysis region 22 is simultaneously also moved from the first catalysis region 22 to the heating device 28.

Figure 7:
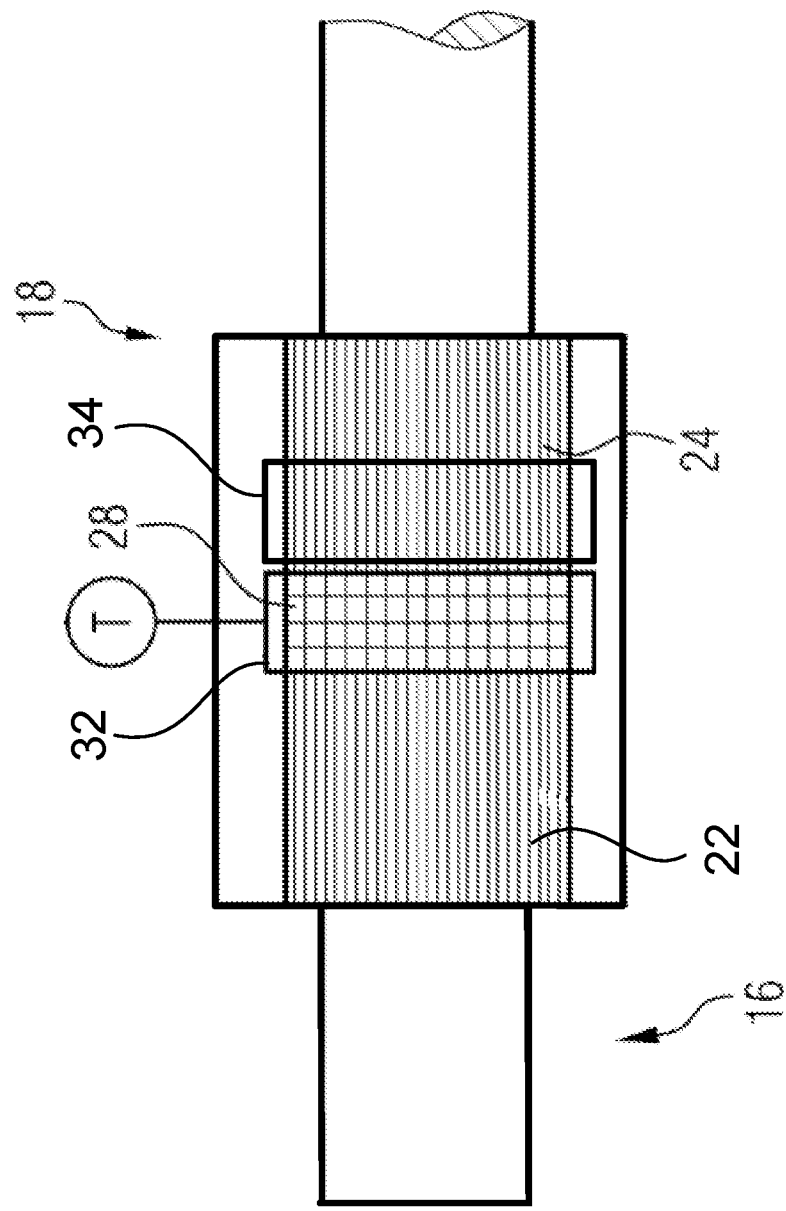

Since the first gas volume 32 has however at least partially already released its heat energy to the first catalysis region 22, the temperature of the first gas volume 32 is now below the predetermined temperature T. The control device 30 will therefore activate the heating device 28 such that the heating device 28 heats the first gas volume 32 again to the predetermined temperature T (FIG. 7).

When the control device 30 has ascertained that the temperature of the first gas volume 32 has attained the predetermined temperature T, the control device 30 controls the electric machine 14 in such a way (FIG. 8) that the electric machine 14 rotates in the first direction of rotation again (for example counterclockwise). The rotation of the electric machine 14 in the first direction of rotation gives rise to a suction action in the exhaust-gas tract 16, such that the heated first gas volume 32 is moved from the heating device 28 to the first catalysis region 22. The heated first gas volume 32 can now heat the first catalysis region 22 again.

Figure 8:
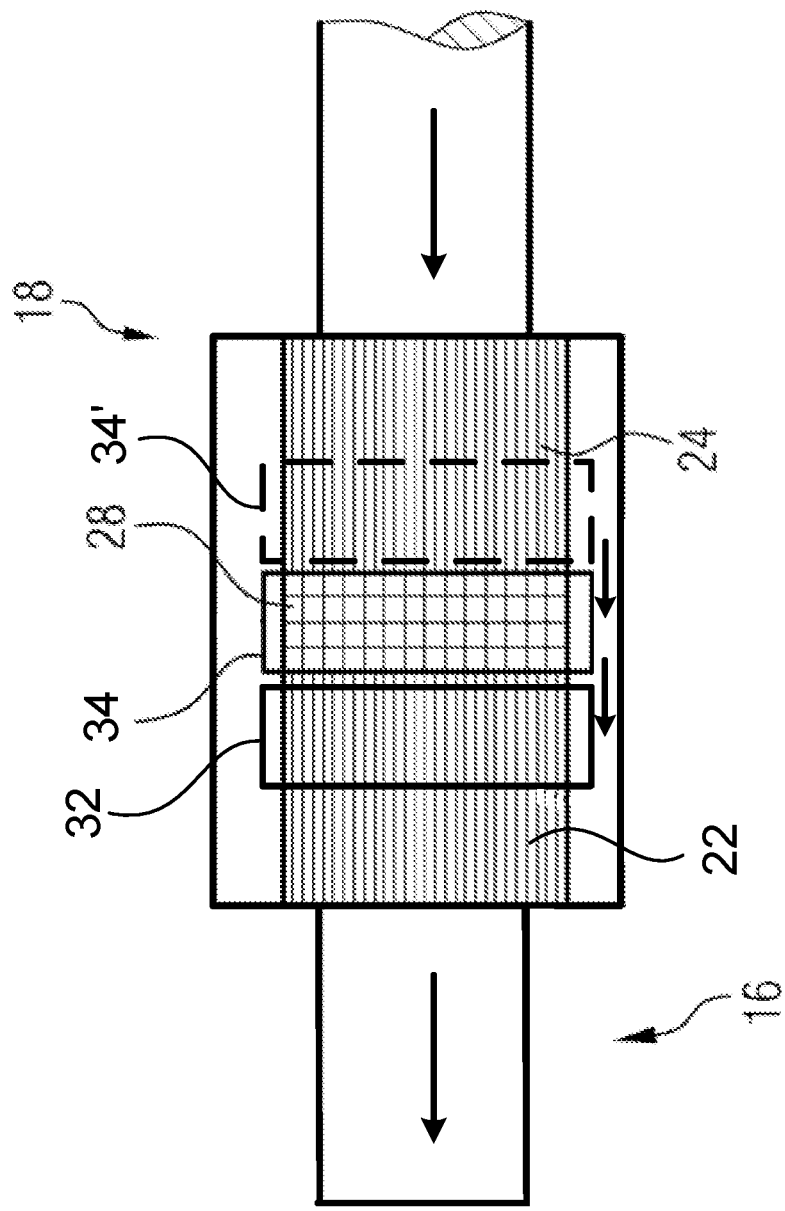

At the same time, the second gas volume 34 is moved from the second catalysis region 24 (indicated by the dashed box 34') to the heating device 28 (FIG. 8). Since the second gas volume 34 has however at least partially already released its heat energy to the second catalysis region 24, the temperature of the second gas volume 34 is likewise below the predetermined temperature T. The control device 30 will therefore activate the heating device 28 such that the heating device 28 heats the second gas volume 34 again to the predetermined temperature T (FIG. 5).

These steps are performed until the control device 30 ascertains that the catalytic converter 18, i.e., the first and second catalysis regions 22, 24, has/have reached the desired operating temperature.

Although the method for controlling the catalytic converter 18 has been described in conjunction with FIGS. 2 to 8 as being such that a first gas volume is firstly moved into the first catalysis region 22 and subsequently a second gas volume into the second catalysis region 24, it is self-evidently also possible that the first gas volume is firstly moved into the second catalysis region 24 and subsequently a second gas volume is moved into the first catalysis region 22.

Although, in conjunction with FIGS. 1 to 8, the catalytic converter 18 has a single heating device 28 between the first and second catalysis regions 22, 24, it is self-evidently also possible for the catalytic converter 18 to have further additional heating devices. For example, a first additional heating device could be arranged centrally in the first catalysis region 22 and a second additional heating device could be arranged centrally in the second catalysis region 24.

The present disclosure is based on the concept of providing a heating device not at the end side of the catalytic converter, as has previously been the case, but between two adjacent catalysis regions. In this way, a gas volume heated by the heating device can, by being moved back and forth, transfer the heat energy of the heating device to the adjacent catalysis regions by convective heat transport. The present disclosure is furthermore based on the concept that a movement of the gas volume back and forth is made possible by forward and backward rotation of the internal combustion engine. The present disclosure is also based on the concept that the forward and backward rotation of the internal combustion engine can be implemented by electric cranking of the internal combustion engine and corresponding reversal of the direction of rotation of the electric machine.

A number of implementations have been described. Nevertheless, it will be understood that various modifications may be made without departing from the spirit and scope of the disclosure. Accordingly, other implementations are within the scope of the following claims.

What is claimed is:

1. A method for heating an electrically heatable catalytic converter in a catalytic converter cold phase in which the catalytic converter has not yet attained a desired operating temperature and an internal combustion engine has not yet been started, the electrically heatable catalytic converter comprising a first catalysis region for a catalytic treatment of exhaust gas, a second catalysis region separate from the first catalysis region, the second catalysis region for the catalytic treatment of the exhaust gas, the second catalysis region arranged downstream of the first catalysis region with a predetermined spacing to the first catalysis region, and an electric heating device through which the exhaust gas flows, the electric heating device arranged downstream of the first catalysis region and upstream of the second catalysis region, the electric heating device designed to at least partially heat the first catalysis region and the second catalysis region, the method comprising the following steps:

a) activating the electric heating device such that the heating device heats a first gas volume, surrounding the heating device, of an exhaust-gas tract to a predetermined temperature;

b) moving the heated first gas volume to the first catalysis region to heat the first catalysis region, wherein, as a result of the movement of the first gas volume to the first catalysis region, a second gas volume, which follows the first gas volume, of the exhaust-gas tract moves to the heating device;

c) activating the electric heating device such that the heating device heats the second gas volume, surrounding the heating device, to a predetermined temperature; and d) moving the heated second gas volume to the second catalysis region to heat the second catalysis region.

2. The method as claimed in claim 1, wherein the steps a) to d) are performed repeatedly until the catalytic converter has attained the desired operating temperature.

3. The method as claimed in claim 1, wherein the internal combustion engine is coupled to an electric machine, and the electric machine is activated such that the electric machine rotates alternately in a first direction of rotation, to move the first gas volume to the first catalysis region, and in a second direction of rotation, which is opposite to the first direction of rotation, to move the second gas volume into the second catalysis region.

* * * * *